US010140381B2

(12) United States Patent
Trikha et al.

(10) Patent No.: US 10,140,381 B2
(45) Date of Patent: Nov. 27, 2018

(54) HTML DEVICE TAGS TO CONTROL OPERATIONAL FEATURES OF DEVICES IN AN INTERNET OF THINGS

(71) Applicant: Cisco Technology, Inc., San Jose, CA (US)

(72) Inventors: Nitesh Trikha, Union City, CA (US); William N. Dry, Raleigh, NC (US); Carlos M. Pignataro, Raleigh, NC (US); Pankaj Srivastava, Belmont, CA (US); Coumara Radja, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

(21) Appl. No.: 14/204,141

(22) Filed: Mar. 11, 2014

(65) Prior Publication Data

US 2015/0261876 A1   Sep. 17, 2015

(51) Int. Cl.
  *G06F 17/00* (2006.01)
  *G06F 17/30* (2006.01)
  *H04L 29/08* (2006.01)

(52) U.S. Cl.
  CPC .... *G06F 17/30896* (2013.01); *G06F 17/3089* (2013.01); *H04L 67/025* (2013.01)

(58) Field of Classification Search
  CPC ...................... G06F 17/30525; G06F 17/2247
  USPC ................................................. 715/234, 200
  See application file for complete search history.

(56) References Cited

U.S. PATENT DOCUMENTS

| 8,782,230 | B1 | 7/2014 | Swedor et al. |
| 9,412,208 | B2 * | 8/2016 | Greenberg ............. G07C 5/008 |
| 9,424,608 | B2 * | 8/2016 | Greenberg ............. G06Q 40/08 |
| 2013/0041997 | A1 | 2/2013 | Li et al. |
| 2013/0173621 | A1 | 7/2013 | Kapoor et al. |
| 2013/0182712 | A1 | 7/2013 | Aguayo et al. |
| 2013/0304264 | A1 | 11/2013 | Shao |
| 2014/0047322 | A1 * | 2/2014 | Kim .................... G06F 17/2247 715/234 |

(Continued)

FOREIGN PATENT DOCUMENTS

WO   2013/130268 A1   9/2013

OTHER PUBLICATIONS

Dave Raggett, The Web of Things: Extending the Web into Real World, published Jan. 24, 2010, W3C, pp. 1-88 (pdf).*

(Continued)

*Primary Examiner* — Manglesh M Patel
(74) *Attorney, Agent, or Firm* — Edell, Shapiro & Finnan, LLC

(57) ABSTRACT

A web browser executes on a device that has controllable operational features, such as sensor, actuator, and process-related features, and that is connected to other devices via a network. The web browser receives a HyperText Markup Language (HTML) document including HTML device tags. Each of the HTML device tags includes a command configured to control a corresponding one of the operational features of the device. The web browser determines, based on each HTML device tag, the command therein to control the corresponding operational feature. The web browser issues the determined command to the corresponding operational feature so as to control the operational feature.

24 Claims, 7 Drawing Sheets

(56) References Cited

U.S. PATENT DOCUMENTS

2014/0052976 A1    2/2014  Marino et al.
2016/0132516 A1*   5/2016  Greenberg .......... G06F 17/3089
                                                         715/202
2016/0226732 A1*   8/2016  Kim ........................ H04L 12/24

OTHER PUBLICATIONS

Dominique Guinard, A Web of Things Application Architecture—Integrating the Real-World into the Web, published 2011, ETH Zurich, pp. 1-245 (pdf).*
Espada et al., Virtual Objects on the Internet of Things,published 2011, International Journal of Artificial Intelligence Multimedia, vol. 1, No. 4, pp. 1-7 (pdf).*
W3C, HTML Working Draft, Jan. 22, 2008, p. 1 (1 Page).
Michael Compton et al., "Semantic Sensor Network Incubator Group Charter", May 21, 2010, http://www.w3.org/2005/Incubator/ssn/charter.
Open Geospatial Consortium, "OGC White Paper—OGC® Sensor Web Enablement: Overview and High Level Architecture", Apr. 2, 2013, 17 Pages.
International Search Report and Written Opinion in counterpart International Application No. PCT/US2015/019623, dated May 28, 2015, 13 pages.
Vipul Gupta et al: "Early lessons from building Sensor.Network: an open data exchange for the web of things", Pervasive Computing and Communications Workshops (PERCOM Workshops), 2010 8th IEEE International Conference on, IEEE, Mar. 29, 2010 , pp. 738-744.
Soliman Moataz et al: "Smart Home: Integrating Internet of Things with Web Services and Cloud Computing", 2013 IEEE 5th International Conference on Cloud Computing Technology and Science, vol. 2, Dec. 2, 2013, pp. 317-320.
Benedikt Ostermaier et al: "WebPlug: A framework for the Web of Things", Pervasive Computing and Communications Workshops (PERCOM Workshops), 2010 8th IEEE International Conference on, Mar. 29, 2010, pp. 690-695.

* cited by examiner

HTML DEVICE TAG 600

```
<wash>
    <device_identifier="washer_unique_id"></device_identifier>
    <detergent_valve state="open">
        <flow_rate units="gpm" value="0.5"></flow_rate>
    </detergent_valve>
    <drain state="closed" />
    <agitator>
        <tachometer units="rpm" value="30"></tachometer>
    </ agitator >
</wash>
```

HTML DEVICE TAGS TO CONTROL OPERATIONAL FEATURES OF DEVICES IN AN INTERNET OF THINGS

TECHNICAL FIELD

The present disclosure relates to managing and controlling Internet of Things (IoT) devices.

BACKGROUND

The Internet of Things (IoT) extends the traditional model of the Internet from one of a network of computers to one of a network of all sorts of real-world items (referred to as "things") configured to communicate with each other and the Internet. Networks of real-world items may include networks of sensors, actuators, and so on. The historical context of the Internet provides the IoT and users of the IoT with a wide selection of Internet utilities, such as Internet-based computer-to-computer communication protocols, and network/web-browser programming languages (e.g., HTML). The existing Internet utilities are well-suited to mere computer-to-computer communication, networking, and control; however, such Internet utilities have limited applicability and relevance to many aspects of the IoT and the things connected thereby that require programming, access, and control.

DESCRIPTION OF EXAMPLE EMBODIMENTS

Overview

Figure 1:
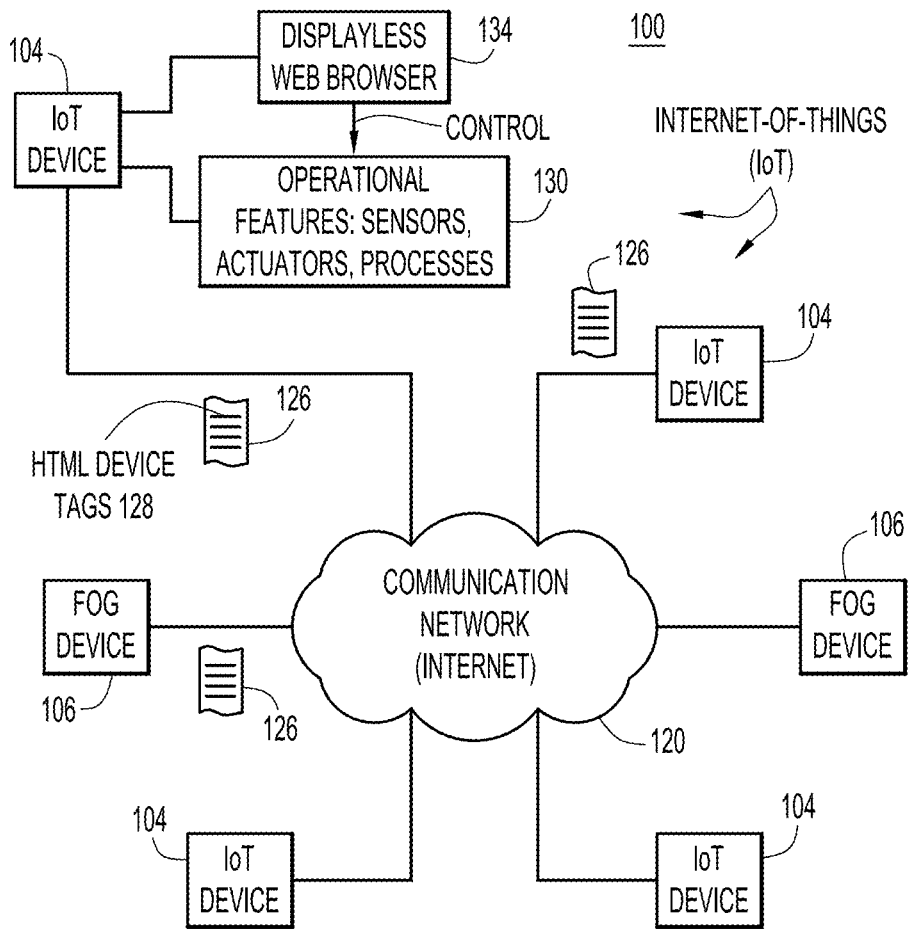
FIG. 1 is a block diagram of an Internet of Things (IoT) and edge/FOG computing network environment in which techniques presented herein may be implemented.

According to techniques presented herein, a web browser is configured to execute on a device that has controllable operational features, such as sensors, actuators, and processes that execute on or in association with the IoT device. The device is configured to connect to other devices via a network. The web browser and the operational features of the device may be displayless. The web browser receives a HyperText Markup Language (HTML) document including HTML device tags. Each of the HTML device tags includes a command configured to control a corresponding one of the operational features of the device. The web browser determines, based on each HTML device tag, the command therein to control the corresponding operational feature. The web browser issues the determined command to the corresponding operational feature so as to control the operational feature.

Example Embodiments

A technique provided herein uses HTML-based constructs and a compatible web browser to communicate between devices in the Internet of Things (IoT), program the IoT devices, and control operational features of the IoT devices. The IoT is an outgrowth of the Internet in which virtual and physical objects or "things" are connected to, and are able to send and receive data to each other via, the Internet. The IoT can be thought of as a dynamic global Internet-like infrastructure with self configuring capabilities based on standard and interoperable communication protocols in which the interconnected things have identities and attributes. The things may be seamlessly integrated into known networks.

"Things" may include all sorts of real-world items, such as streets, buildings, household appliances, medical equipment, apparel, vehicles, personal identification tags (PIDs), computers, smartphones, cameras, and so on. The things are each outfitted with a device (referred to as an IoT device) to provide Internet connectivity. The IoT device may be the thing itself, affixed to the thing, or otherwise associated with the thing. The IoT device includes a programmable controller to control features of the thing, and a transceiver (such as a radio frequency identification (RFID) tag, for example) to communicate with the Internet and other IoT devices using various Internet communication protocols. The things/IoT devices may also be equipped with sensors, transducers, and/or actuators that provide associated information or impart an action, depending on a given application; examples include acoustical, optical, thermal, electrical, mechanical, electro-mechanical, chemical, biological, and positional sensors, transducers, and/or actuators.

Thus, the IoT provides a network of IoT devices and an associated suite of Internet communication protocols through which the various interconnected IoT devices may be identified, monitored, queried for information, managed or controlled (e.g., programmed to perform desired functions), and configured. As will be described below, an IoT network programming language, such as a modified HTML, may be used to program web browser-enabled IoT devices to (i) perform desired actions, and (ii) enable the IoT devices to be visited/navigated in their respective networks, similar to the way in which HTML is used to program Internet web pages and enable the web pages to be visited/navigated on the Internet in client-server communication model.

Also, intersecting with the IoT is the concept of edge computing (also referred to herein as FOG computing). FOG computing pushes applications, data, and computing power (including computing services) away from centralized points in a network to logical extremes or edges of the network. FOG computing covers a wide range of technologies including wireless sensor and actuator networks, mobile data acquisition, mobile signature analysis, cooperative distributed peer-to-peer ad hoc networking and processing. In FOG computing, services are hosted at the network edge or even at end devices such as set-top-boxes or access points, which may be incorporated into the IoT. Like IoT devices, FOG computing devices may be controlled and programmed using a network programming language, such as HTML.

FIG. 1 is a block diagram of an IoT and FOG computing network environment 100 in which techniques presented herein may be implemented. Network environment 100 includes multiple IoT devices 104 and multiple FOG computing devices 106 each connected with a communication network 120. Communication network 120 may include one or more wide area networks (WANs), such as the Internet, and one or more local area networks (LANs). IoT devices 104 and FOG devices 106 communicate with each other and communication network 120 using a variety of Internet protocols, such as the Hypertext Transfer Protocol (HTTP), the Transmission Control Protocol (TCP), and the like. For example, IoT devices 104 may each send and receive HTML web pages 126 to and from communication network 120. The IoT devices in FIG. 1 may be referred to herein collectively as IoT devices 104 or singularly as an IoT device 104.

In the example of FIG. 1, IoT devices 104 each included operational features 130, such as actuators, sensors, and processes that are performed by the IoT device or by the "thing" associated with the IoT device. Network elements 130 are each browser-enabled, meaning that the network elements each host a web browser 134 configured to receive and interpret web documents 140, such as Hypertext Markup Language (HTML) formatted documents. IoT devices 104 are each browser-enabled, meaning that the IoT devices each host the web browser 134 configured to receive and interpret web documents 126, such as Hypertext Markup Language (HTML) formatted documents. Some of IoT devices 104 may not include a display and are thus referred to as displayless IoT devices. IoT devices 104 that are displayless may each host a displayless or windowless embedded web browser. Using respective web browsers 134, IoT devices 104 may send and receive HTML web pages 126, and parse and interpret the received web pages. The web browsers 134 depicted in FIG. 1 may be referred to herein collectively as web browsers 134 or singularly as web browser 134.

According to techniques described herein, HTML web pages 126 are constructed to include HTML device tags 128 (also referred to as "HTML control tags" 128) intended to control operational features 130 of IoT devices 104. The HTML device tags 128 include commands to identify, configure, collect information from, and activate operational features 130 (e.g., the sensors, actuators, and process features) of IoT devices 104. Web browsers 134 are configured to interpret the received HTML web pages 126 and device tags 128 therein. Web browsers 134 send commands associated with the interpreted device tags 128 to operational features 130 of IoT devices 104 in order to effect a desired action. In this way, HTML web pages 126 may be programmed to include HTML device tags 128 to control IoT devices 104 via their respective web browser 134.

Figure 2:
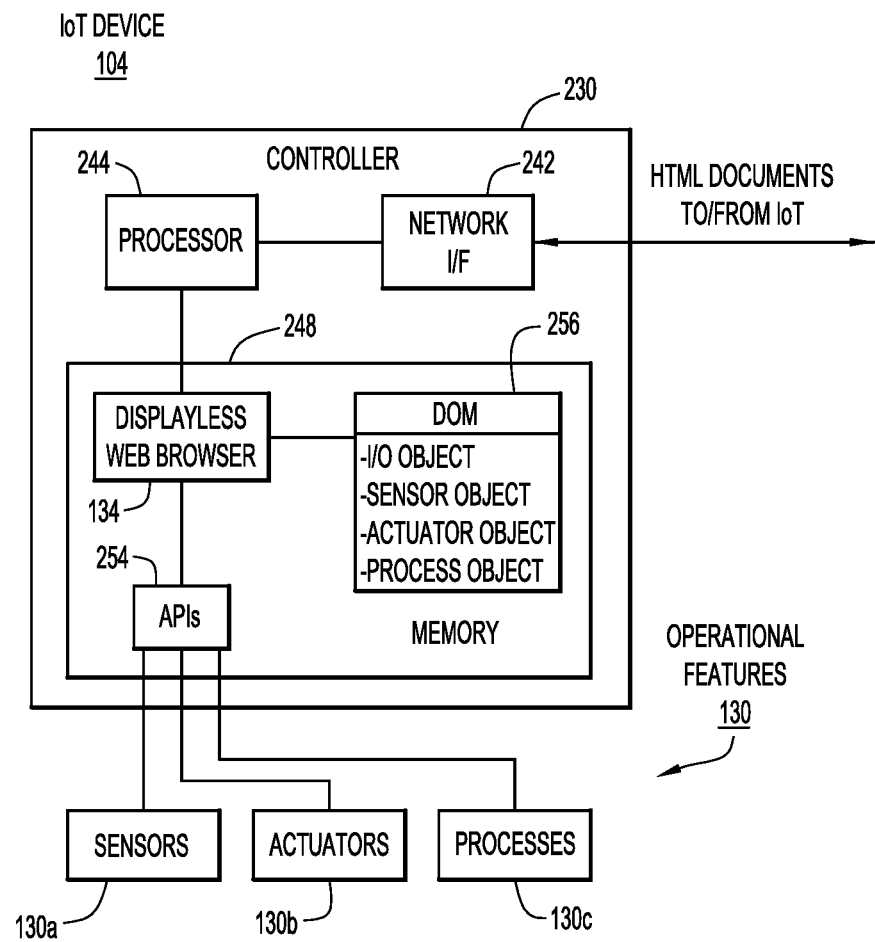
FIG. 2 is a block diagram of an example IoT device configured to implement the techniques presented herein.

Reference is now made to FIG. 2, which shows an example block diagram of one of IoT devices 104 configured to perform the operations described herein. There are numerous possible configurations for each of IoT devices 104 and FIG. 2 is meant to be an example. IoT device 104 includes a controller 230, which includes a network interface (I/F) unit 242, a processor 244, and memory 248. IoT device 104 also includes operational features 130 that operate under control of controller 230, including sensors 130a, actuators 130b, and processes 130c that are performed by the IoT device or the thing associated with the IoT device.

The network I/F unit 242 is, for example, an Ethernet card device that allows controller 244 to communicate over a network, e.g., a wired (Ethernet) network. Network I/F unit 242 may also include wireless connection capability, such as an RFID tag transceiver, a Wi-Fi™ transceiver and/or a 4G or LTE transceiver. The processor 244 is a microcontroller or microprocessor, for example, configured to execute software instructions stored in the memory 248.

Memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 248 may comprise one or more computer readable storage media (e.g., a memory device) encoded with software comprising computer executable instructions and when the software is executed (by the processor 244) it is operable to perform the operations described herein.

For example, memory 248 stores instructions for web browser 134 to implement web browser operations responsive to received HTML web pages 126, and also stores instructions to implement application programming interfaces (APIs) APIs 254 through which the web browser 134 may communicate with and control operational features 130. APIs 254 may be embedded in web browser 134. In addition, memory 248 stores data generated and used by web browser 134 and APIs 254, including a Device Object Model (DOM) 256 corresponding to possible HTML tags relevant to IoT device 104. DOM 256 includes sensor objects, actuator objects, and process objects corresponding to sensors 130a, actuators 130b, and processes 130c, respectively, and their interrelationships. DOM 256 also includes an I/O object to model communication protocols used by IoT device 104. Note that web browser 134 may be regarded as an API itself, in which case APIs 254 depicted in FIG. 2 are APIs other than the web browser API.

Figure 3:
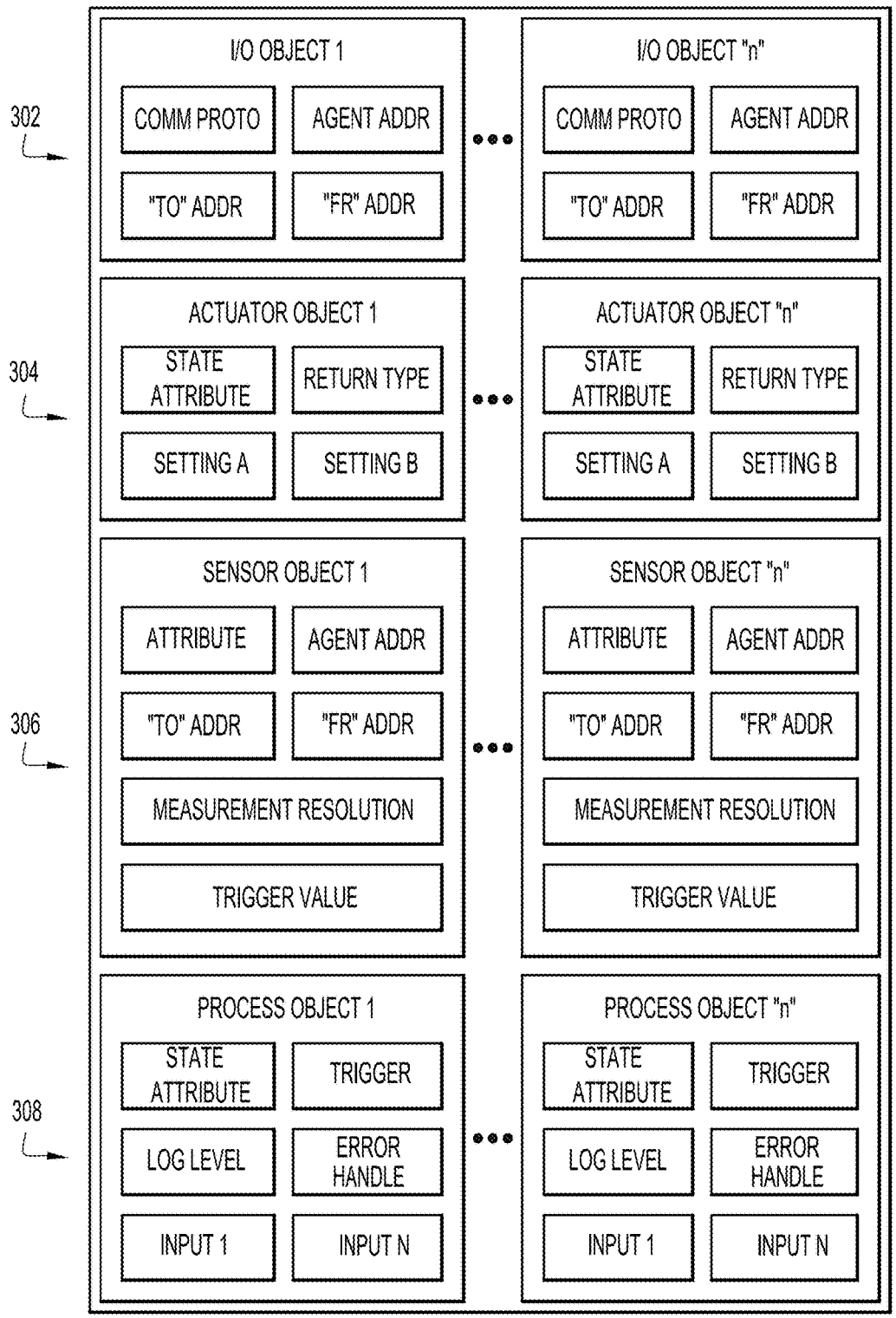
FIG. 3 is an illustration of example device objects of an IoT device that are used by a device object model (DOM) in the IoT device.

As mentioned above, DOM 256 models operational features 130 of IoT device 104, including sensors 130a, actuators 130b, and processes 130c as objects in the DOM, as depicted in FIG. 3. With reference to FIG. 3, there is a block diagram of example device objects 300 of IoT device 104 that are used by/modeled in DOM 256. Device objects 300 define the service capabilities offered by and specific to IoT device 104. Device objects 300 include the following objects, for example:

i. I/O objects 302, which are representative of I/O communication features of IoT device 104, such as ports, protocols, and addresses. I/O objects 302 each include example fields for a communication protocol, an agent address, and To and From addresses;

ii. actuator objects 304, which are representative of actuators of IoT device 104, such as electromechanical actuators, e.g., motors. Actuator objects 304 each include example fields for a state attribute, a value return type, and multiple value settings, e.g., settings A and B;

iii. sensor objects 306, which are representative of sensors of IoT device 104. Sensor objects 306 each include example fields for To, From, and Agent addresses, a measurement resolution provided by the sensor, and a trigger value at which the sensor is triggered; and iv. process objects 308, which are representative of processes performed by IoT device 104 and which involve the actuators and sensors of the IoT device. Process objects 308 each include example fields for a state of the process, a trigger for the processor, inputs to the process, and a log level, and an error handle.

Each of objects 302-308 provides a list of addressable and controllable capabilities and/or attributes (i.e., service capabilities) represented in the various fields of the corresponding object. The fields of each of objects 302-308 are populated by an HTML author (e.g., developer/user) using value ranges permitted by the characteristics of IoT device 104 and limits imposed by DOM 256. The HTML author populates the fields of each of objects 302-308 using HTML device tags and associated device tag attributes.

Figure 4:
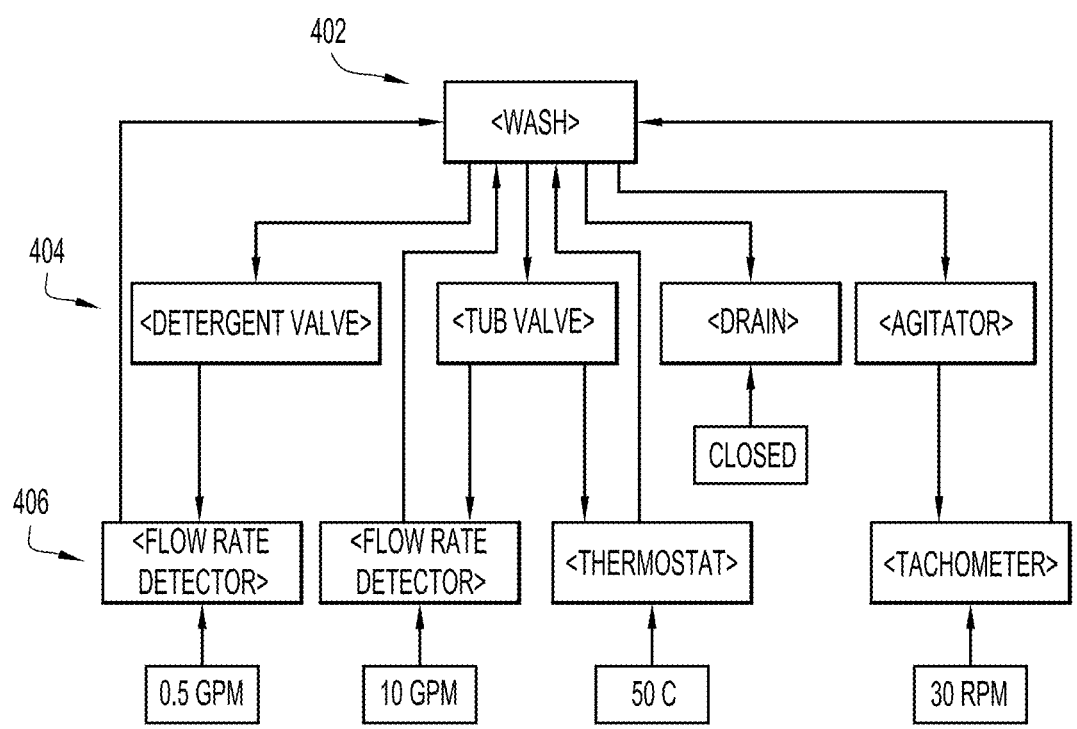
FIG. 4 is an illustration of an example DOM used in an embodiment in which an IoT device is associated with a wash cycle of a washing machine.

Turning to FIG. 4, there is an illustration of an example DOM 400 used in an embodiment in which IoT device 104 is associated with a washing machine. DOM 400 represents a process of executing a wash cycle in the washing machine. DOM 400 represents in an inverted-tree structure depicting relationships among process object 402, actuator objects 404, and sensor objects 406 for corresponding objects defined in a structure of device objects for the washing machine (not shown), similar to the structure of device objects 300 depicted in FIG. 3. Process object 402 includes the process object <wash>. Actuator objects 404 include the actuator objects <detergent values>, <tub values>, <drain>, and <agitator>. Sensor objects 406 include sensor objects <flow rate>, <thermostat>, and <tachometer>.

Figure 5:
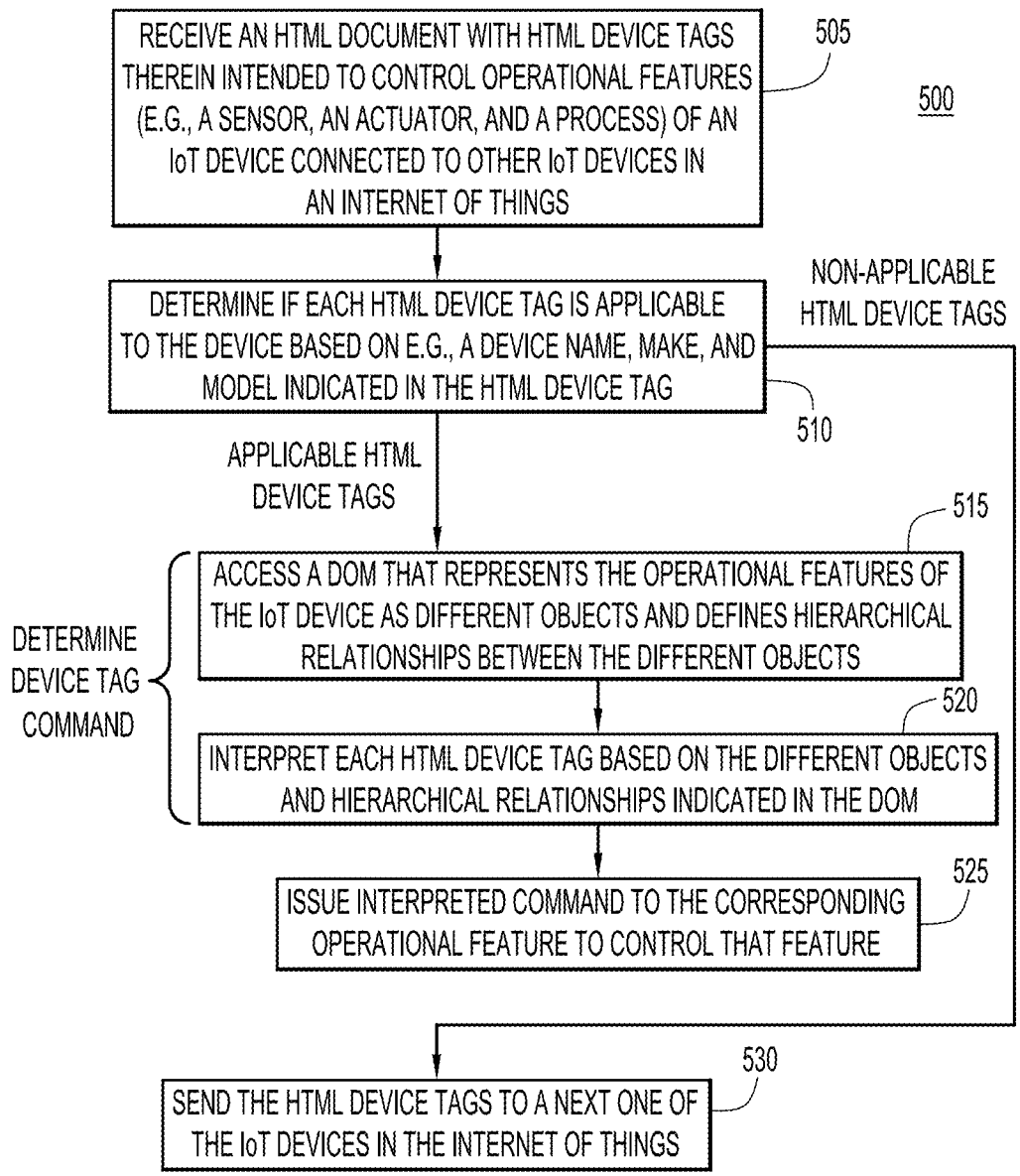
FIG. 5 is a flowchart of an example method of using HTML network tags with a web browser to control operational features of the IoT device of FIG. 2.

With reference to FIG. 5, there is a flowchart of an example method 500 of using HTML device tags 128 with web browser 134 to control displayless operational features of IoT device 104 in the IoT. The method is performed by web browser 134 using DOM 256 and APIs 254. Reference can also be made to FIGS. 1-4 for purposes of the description of FIG. 5.

At 505, web browser 134 of IoT device 104 receives HTML document(s) 126 including HTML device tags 128 therein intended to control operational features 130, such as sensors 130a, actuators 130b, and processes 130c. Each of device tags 128 includes a command (or multiple commands) configured to control a corresponding one of operational features 130. The commands are intended to cause operational features 130 to perform actions, and may include commands to activate, deactivate, or otherwise control the operational features, and may also include query-response commands to read information, such as sensed values, from the operational features. In an embodiment, the HTML documents are formatted according to HTML5 and the HTML device tags are provided as custom defined HTML5 tags. In other words, the HTML5 device tags are a custom extension of the HTML5 format standard. In this embodiment, browser 134 is configured to interpret HTML5 formatted language and the HTML5 device tags.

At 510, web browser 134 determines if each HTML device tag 128 is intended for, i.e., is applicable to, IoT device 104, based on a device name, make, and model indicated in the HTML device tag. For each of HTML device tags 128 determined to be intended for device 104, flow proceeds to next operations 515, 520, and 525.

At 515, web browser 134 accesses DOM 256 that represents operational features 130 of IoT device 104 as different objects and defines hierarchical relationships between the different objects, as described above in connection with FIGS. 3 and 4.

At 520, web browser 134 interprets each HTML device tag 128 based on the different objects and hierarchical relationships indicated in DOM 256. In operation, 520, each interpreted HTML device tag 128 may be deconstructed into a primitive or low-level command understood by a corresponding one of APIs 254. Collectively, operations 515 and 520 determine the commands associated with each of HTML device tags 128 intended for IoT device 104.

At 525, web browser 134 issues/sends the interpreted commands, e.g., command primitive, to the corresponding ones of APIs 254, which in turn control operational features 130 accordingly.

Returning to 510, for each of HTML device tags 128 determined not to be intended for IoT device 104, flow proceeds to 530.

At 530, web browser 134 sends the HTML device tags 128 determined not to be intended for IoT device 104 to a next one of the other IoT devices connected in the Internet of Things. This communication may be a web browser-to-web browser communication using the Hypertext Transfer Protocol (HTTP), for example.

Figure 6:
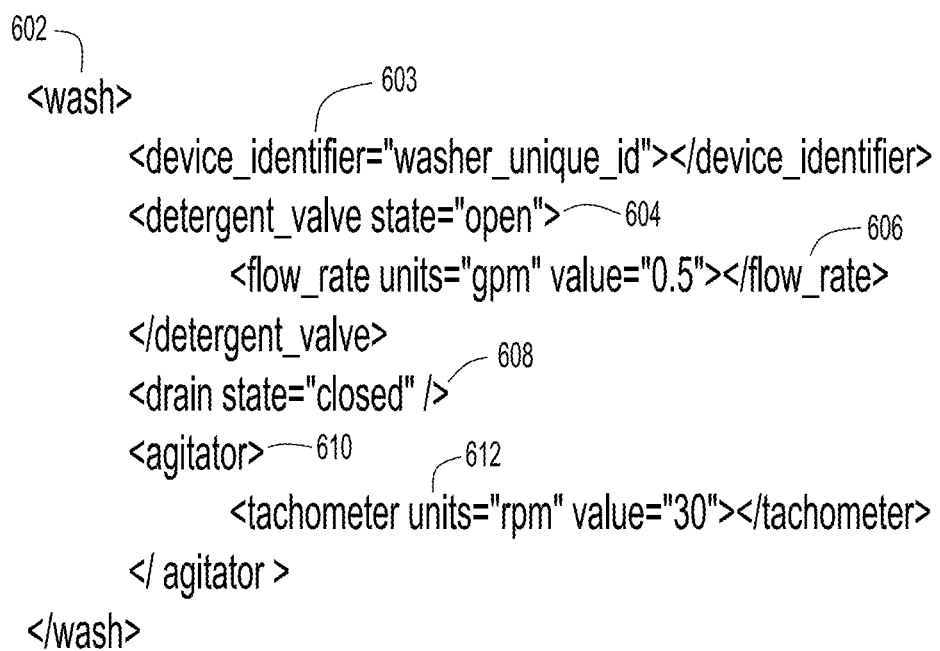
FIG. 6 is an example HTML device tag associated with the wash cycle related DOM of FIG. 4.

With reference to FIG. 6, there is depicted an example HTML device tag 600 used in connection with the wash cycle process described above. HTML device tag 600 may be formatted in accordance with an extended version of HTML5. Device tag 600 includes the following object descriptors: a <wash> cycle process descriptor 602; a device identifier (ID) descriptor 603 identifying a washer with a "washer_unique_id" as the target device (the "washer_unique_id" may include one or more of a make, model, serial number, or other uniquely identifying information that may be matched against ID information stored in a memory of the IoT device); a <detergent valve> actuator descriptor 604 having a detergent valve "open" command therein; a flow rate sensor/detector descriptor 606 having a flow rate sensor read command therein to read a current value of the flow rate sensor (which returns "0.5 gpm"); a <drain> actuator descriptor 608 having a drain "closed" command therein; and an <agitator> actuator descriptor 610 that includes an associated <tachometer> sensor read command 612 therein (which returns "30 rpm"). While device ID descriptor 603 is embedded in HTML device tag 600, the ID descriptor may also be located outside of the HTML device tag, i.e., at a higher level of an HTML document in which HTML device tag 600 is embedded.

Figure 7:
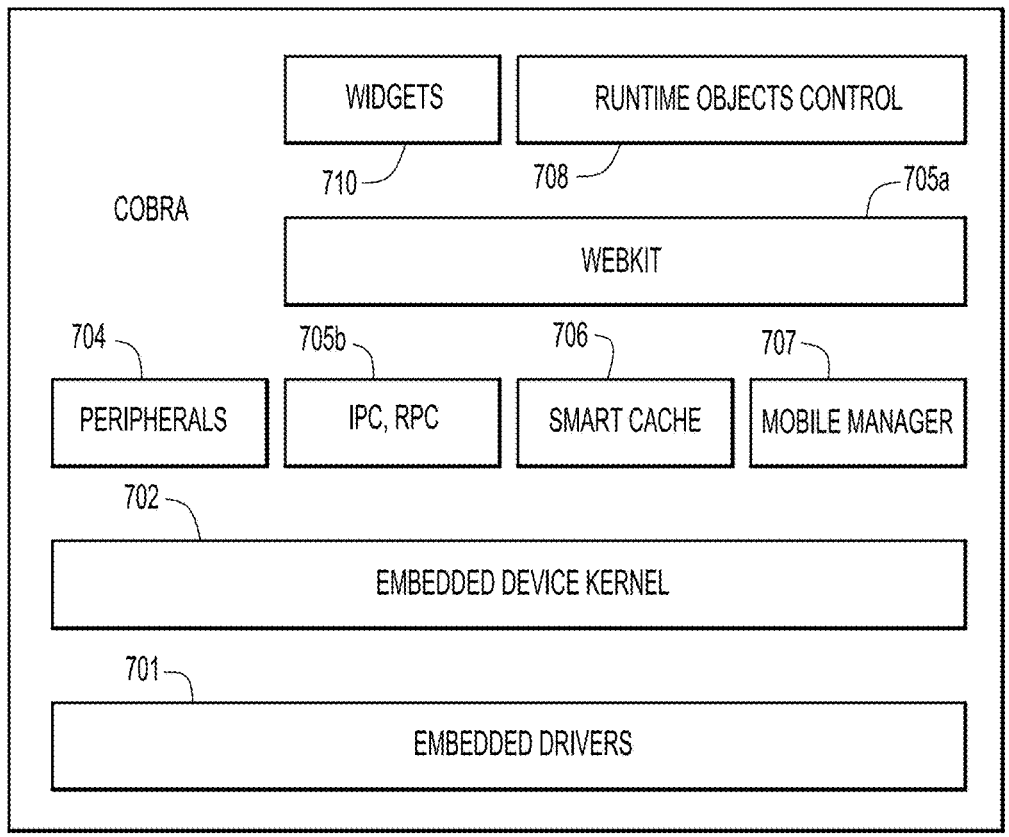
FIG. 7 is a block diagram of a displayless web browser that may be executed on the IoT device of FIG. 2.

With reference to FIG. 7, there is depicted a block diagram of a displayless version of web browser 134 that may be executed on IoT device 104, according to an embodiment. The embodiment of web browser 134 may be based on the COBRA web browser by Cisco.

Displayless web browser 134 includes the following embedded operating system-related features, which may include embedded logic to process HTML device tags 128 as describe herein:
 i. embedded drivers 701 to interface with APIs 254, e.g., to send command primitive derived from HTML device tags 128 to and receive status information from the APIs; and
 ii. an embedded device operating system (OS) kernel 702 to interface with an embedded OS of IoT device 104. Logic drivers 701, for example.

Displayless web browser 134 also includes the following software platform features:
 i. web-based peripheral operations 704;
 ii. WebKit 705a with a WebKit extension for remote procedure call (RPC)/Inter-process communication (IPC) 705b, used for enabling system widgets, such as a camera and printing;
 iii. a web cache "SmartCache" 706; and
 iv. a mobile manager 707, which includes an HTTP(S) based post mechanism for cloud control, remote upgrades;

Displayless web browser 134 also includes the following application-level features:
 i. runtime web objects control 708, which performs runtime control of web objects to facilitate seamless integration of the web browser with other existing web applications; and ii. widgets 710, including built-in java-script API driven objects that integrate with functions in other web applications to provide a secure fault-tolerant collaborative browser framework.

Techniques presented herein (i) define an HTML IoT network programming language that includes HTML device tags, and (ii) expand the scope of an HTML browser, such as an HTML5 browser, so that the web browser can interpret the HTML device tags and apply their embedded commands to IoT devices on which the web browsers execute. The commands can be used to perform identification, discovery, and operations of IoT devices, and control the configuration and runtime actions of the IoT devices. The combination of the HTML device tags and the web browsers on IoT devices can be used as a framework for managing and controlling operational features of the IoT devices when connected to each other in an IoT. More specifically, the techniques embed HTML device tag processing into the web browsers. The embedded processing becomes a web interface that parses HTML device tags and applies the commands therein to the operational features of the IoT devices.

The web browsers and HTML device tags make available to IoT devices standardized web protocols, architectures, query-response processing, APIs surfaces, and script interaction interfaces.

The web browser may not include a display (although a web browser that includes a display and display controls may also be used in other embodiments). Thus, the focus of the web browser is shifted away from that of a software application for retrieving, presenting and traversing information resources on the World Wide Web, as is generally known, to that of being:
  i. an agent for the purposes of parsing HTML programming for a web-defined network of devices (i.e., an IoT);
  ii. a central point for identification, discovery, configuration, and management of all of interconnected IoT devices; and
  iii. a set of APIs for application provisioning as well as control of the IoT devices.

The combination of web browsers and HTML device tags allow for secure machine-to-machine (M2M) pairing in a self contained communication network, and enable interconnected devices, such as wearable devices and refrigerators in the home, to be managed and controlled from a central location over the Internet.

In summary, in one form, a method is provided, comprising: at a web browser configured to execute on a device that has controllable operational features and is configured to connect to other devices via a network: receiving a HyperText Markup Language (HTML) document including HTML device tags each including a command configured to control a corresponding one of the operational features; determining, based on each HTML device tag, the command therein to control the corresponding operational feature; and issuing the determined command to the corresponding operational feature so as to control the operational feature.

In another form, an apparatus is provided, comprising: a network interface unit configured to send and receive communications over a network; a processor coupled to the network interface unit and configured to: execute a web browser configured to communicate with a set of application program interfaces through which the web browser controls controllable operational features of the apparatus; receive, by the web browser, a HyperText Markup Language (HTML) document including HTML device tags each including a command configured to control a corresponding one of the operational features; determine, by the web browser, based on each HTML device tag, the command therein to control the corresponding operational feature; and issue, by the web browser, the determined command to the corresponding operational feature so as to control the operational feature.

In still another form, a processor readable medium is provided for storing instructions that, when executed by a processor, cause the processor to: execute a web browser configured to communicate with a set of application program interfaces through which the web browser controls controllable operational features of a device connected to a network of devices; receive, by the web browser, a HyperText Markup Language (HTML) document including HTML device tags each including a command configured to control a corresponding one of the operational features; determine, by the web browser, based on each HTML device tag, the command therein to control the corresponding operational feature; and issue, by the web browser, the determined command to the corresponding operational feature so as to control the operational feature.

Although the method, apparatus, and computer program product/processor readable medium are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a web browser configured to execute on a displayless Internet of Things (IoT) device that has controllable operational features and is configured to connect to other devices via a network:
     receiving a HyperText Markup Language (HTML) document including HTML device tags each including a command configured to control a corresponding one of the operational features;
     accessing a device object model (DOM) that represents the operational features of the displayless IoT device;
     parsing each of the HTML device tags based on the DOM to identify the command included therein;
     determining if a particular HTML device tag of the HTML device tags is applicable to the displayless IoT device based on a device name, make, and model indicated in the particular HTML device tag;
     if it is determined that the particular HTML device tag is applicable to the displayless IoT device, issuing the command to the corresponding operational feature to control a physical aspect of the corresponding operational feature; and
     if it is determined that the particular HTML device tag is not applicable to the displayless IoT device, sending the HTML document to a next one of other IoT devices in the network.

2. The method of claim 1, wherein:
   the operational features of the displayless IoT device include a sensor, an actuator, and a process that is performed by the displayless IoT device;

collectively, the HTML device tags include commands intended to control the sensor, the actuator, and the process; and the issuing includes issuing the commands to corresponding ones of the sensor, the actuator, and the process to control the sensor, the actuator, and the process responsive to the HTML device tags.

3. The method of claim 2, wherein the issuing includes issuing the commands to cause actions that identify, configure, collect information from, and activate various ones of the sensor, actuator, and the process.

4. The method of claim 1, wherein the DOM represents the operational features of the displayless IoT device as different objects and defines hierarchical relationships between the different objects and parsing based on the DOM further comprises:

interpreting each of the HTML device tags based on the different objects and the hierarchical relationships of the DOM.

5. The method of claim 1, wherein accessing the DOM includes accessing:

a process object of the DOM corresponding to a first operational feature including a process performed by the displayless IoT device;

an actuator object of the DOM corresponding to a second operational feature including a device actuator associated with the process; and a sensor object of the DOM corresponding to a third operational feature including a device sensor associated with the process.

6. The method of claim 1, wherein the HTML document and the HTML device tags included therein are formatted according to the HTML5 standard.

7. The method of claim 1, wherein the displayless IoT device is an edge computing device that is connected at an edge of the network.

8. The method of claim 1, wherein the sending of the HTML document to the next one of the other IoT devices comprises:

sending a web browser-to-web browser communication using the Hypertext Transfer Protocol (HTTP).

9. A displayless Internet of Things (IoT) apparatus comprising:

a network interface unit configured to send and receive communications over a network;

a processor coupled to the network interface unit and configured to:

execute a web browser configured to communicate with a set of application program interfaces through which the web browser controls controllable operational features of the displayless IoT apparatus;

receive, by the web browser, a HyperText Markup Language (HTML) document including HTML device tags each including a command configured to control a corresponding one of the operational features;

access, by the web browser, a device object model (DOM) that represents the operational features of the displayless IoT apparatus;

parse, by the web browser, each of the HTML device tags based on the DOM to identify the command included therein;

determine if a particular HTML device tag of the HTML device tags is applicable to the displayless IoT apparatus based on an apparatus name, make, and model indicated in the particular HTML device tag;

if it is determined that the particular HTML device tag is applicable to the displayless IoT apparatus, issue, by the web browser, the command to the corresponding operational feature to control a physical aspect of the corresponding operational feature;

if it is determined that the particular HTML device tag is not applicable to the displayless IoT apparatus, send the HTML document to a next one of other IoT apparatuses in the network.

10. The displayless IoT apparatus of claim 9, wherein:

the web browser is configured to communicate with other web browsers executing on other IoT devices via the network;

the operational features include a sensor, an actuator, and a process;

collectively, the HTML device tags include commands intended to control the sensor, the actuator, and the process; and the processor is configured to issue the commands to corresponding ones of the sensor, the actuator, and the process to control the sensor, the actuator, and the process responsive to the HTML device tags.

11. The displayless IoT apparatus of claim 10, wherein the processor is configured to issue the commands to cause actions that identify, configure, collect information from, and activate various ones of the sensor, actuator, and the process.

12. The displayless IoT apparatus of claim 9, wherein the DOM represents the operational features of the displayless IoT apparatus as different objects and defines hierarchical relationships between the different objects and the processor is configured to parse by:

interpreting each of the HTML device tags based on the different objects and the hierarchical relationships of the DOM.

13. The displayless IoT apparatus of claim 9, wherein the DOM includes:

a process object of the DOM corresponding to a first operational feature including a process performed by the displayless IoT apparatus;

an actuator object of the DOM corresponding to a second operational feature including an apparatus actuator associated with the process; and a sensor object of the DOM corresponding to a third operational feature including an apparatus sensor associated with the process.

14. The displayless IoT apparatus of claim 9, wherein the HTML document and the HTML device tags included therein are formatted according to the HTML5 standard.

15. The displayless IoT apparatus of claim 9, wherein the displayless IoT apparatus is an edge computing device that is connected at an edge of the network.

16. The displayless IoT apparatus of claim 9, wherein in sending the HTML document to the next one of the other IoT devices, the processor:

sends a web browser-to-web browser communication using the Hypertext Transfer Protocol (HTTP).

17. A non-transitory processor readable medium storing instructions that, when executed by a processor, cause the processor to:

execute a web browser configured to communicate with a set of application program interfaces through which the web browser controls controllable operational features of a displayless Internet of Things (IoT) device connected to a network of other IoT devices;

receive, by the web browser, a HyperText Markup Language (HTML) document including HTML device tags each including a command configured to control a corresponding one of the operational features;

access, by the web browser, a device object model (DOM) that represents the operational features of the displayless IoT device;

parse, by the web browser, each of the HTML device tags based on the DOM to identify the command included therein; and determine if a particular HTML device tag is applicable to the displayless IoT device based on a device name, make, and model indicated in the particular HTML device tag;

if it is determined that the particular HTML device tag is applicable to the displayless IoT device, issue, by the web browser, the command to the corresponding operational feature to control a physical aspect of the corresponding operational feature; and if it is determined that the particular HTML device tag is not applicable to the displayless IoT device, send the HTML document to a next one of the other IoT devices connected to the network.

18. The non-transitory processor readable medium of claim 17, wherein:

the web browser is configured to communicate with other web browsers executing on the other IoT devices;

collectively, the HTML device tags include commands intended to control a sensor, an actuator, and a process of the displayless IoT device; and the instructions to cause the processor to issue include instructions to cause the processor to issue the commands to corresponding ones of the sensor, the actuator, and the process to control the sensor, the actuator, and the process responsive to the HTML device tags.

19. The non-transitory processor readable medium of claim 18, wherein the instructions to cause the processor to issue include instructions to cause the processor to issue the commands to cause actions that identify, configure, collect information from, and activate various ones of the sensor, actuator, and the process.

20. The non-transitory processor readable medium of claim 17, wherein the DOM represents the operational features of the displayless IoT device as different objects and defines hierarchical relationships between the different objects and the instructions to cause the processor to parse include instruction to cause the processor to:

interpret each of the HTML device tags based on the different objects and the hierarchical relationships of the DOM.

21. The non-transitory processor readable medium of claim 17, wherein the DOM includes:

a process object of the DOM corresponding to a first operational feature including a process performed by the displayless IoT device;

an actuator object of the DOM corresponding to a second operational feature including a device actuator associated with the process; and a sensor object of the DOM corresponding to a third operational feature including a device sensor associated with the process.

22. The non-transitory processor readable medium of claim 17, wherein the HTML document and the HTML device tags included therein are formatted according to the HTML5 standard.

23. The non-transitory processor readable medium of claim 17, wherein the displayless IoT device is an edge computing device that is connected at an edge of the network.

24. The non-transitory processor readable medium of claim 17, wherein the instructions that cause the processor to send the HTML document to the next one of the other IoT devices comprise instructions that cause the processor to:

send a web browser-to-web browser communication using the Hypertext Transfer Protocol (HTTP).

* * * * *